INVENTOR
EVERETT GORIN
BY
*D. Leigh Fowler Jr.*
ATTORNEY

Patented Jan. 8, 1952

2,581,651

UNITED STATES PATENT OFFICE 2,581,651

INTEGRATED GASIFICATION ELECTRO-CHEMICAL SYSTEM

Everett Gorin, Pittsburgh, Pa., assignor to Pittsburgh Consolidation Coal Company, Pittsburgh, Pa., a corporation of Pennsylvania Application August 31, 1951, Serial No. 244,566

8 Claims. (Cl. 136—84)

This invention relates to the conversion of carbon to electrical energy and, more particularly, to a process and an apparatus for converting carbon to electrical energy through the medium of a fuel cell.

Fuel cells have been proposed and developed which are adapted to generate electricity by the combustion of carbon monoxide and hydrogen using air as the oxidizing gas. Particular success has been achieved when the cells are operated at high temperatures. In the prior fuel cells of this type, the carbon monoxide and hydrogen are first generated in a separate gasification zone and then fed to the cathode end of a fuel cell. If we assume that the maximum efficiency heretofore realized in each of the two separate steps is achieved, the over-all efficiency is of the order of 40 per cent.

In my copending application Serial Number 168,806, filed June 17, 1950, now U. S. Patent 2,570,543 granted October 9, 1951, and assigned to the assignee of the present invention, a process is described for converting carbon to electrical energy at efficiencies as high as 75 per cent. These high efficiencies are attained by operating the fuel cell at an elevated temperature above that of the carbon monoxide and hydrogen generation zone and by transferring heat from the high temperature fuel cell to the gas generation zone to provide the heat required to maintain the endothermic steam-carbon reaction. Since it is desirable not to operate the fuel cell much above 1700° F., the temperature of the steam-carbon gasification zone must then be below that at which the steam-carbon reaction is normally conducted for optimum results. Accordingly, the steam conversion is less than that required for the attainment of the maximum efficiency of conversion of carbon to electrical energy, unless a reactive carbon or a suitable catalyst is employed to raise the steam conversion rate. It would be desirable, therefore, to provide an integrated gasification electrochemical system wherein the heat evolved in the fuel cell is utilized to maintain the steam-carbon reaction and wherein the efficiencies achieved are independent of the steam conversion effected in the gasification zone.

In accordance with the present invention, a process and apparatus are provided for converting carbon to electrical energy at an over-all efficiency as high as 80 per cent. The latter efficiency is somewhat higher even than that attainable with the process described in the above-mentioned application, and twice as high as that achieved by prior art systems employing fuel cells. Furthermore, the realization of these efficiencies is not dependent upon having high steam conversion in the gasification zone. Consequently, it is not necessary to employ reactive carbon or catalysts to attain the high efficiencies of the present invention.

Specifically, my invention comprises an integrated gasification electrochemical system in which steam and carbon dioxide at an elevated temperature are reacted with carbon in a gasification zone to form a gaseous product containing carbon monoxide, hydrogen and unreacted steam and carbon dioxide. This gaseous mixture and an oxidizing gas i. e. one containing free oxygen are separately conducted to an oxidation-reduction electrochemical reaction zone comprising one or more fuel cells which are designed to operate at elevated temperatures above that of the gasification zone. In this zone, the carbon monoxide and hydrogen are oxidized to carbon dioxide and water (i. e. steam). The heat of combustion thereof is in part evolved in the form of electrical energy while the remainder is evolved as heat to maintain the temperature of the fuel cell preferably in the range of 1300° F. to 1650° F.

The hot gaseous oxidation products and unreacted steam and carbon dioxide from the electrochemical zone are recycled, while still at substantially the temperature of the fuel cell, i. e. without intentional cooling, back to the gasification zone. The quantity of recycled gas is regulated to maintain the endothermic reactions occurring in the gasification zone, namely (1) $C + H_2O \rightarrow CO + H_2$ and (2) $CO_2 + C \rightarrow 2CO$. A regulated amount of the carbon dioxide from the fuel cell is discharged from the system in order to maintain substantially constant the quantity of carbon dioxide fed back to the gasification zone.

The relative proportions of carbon dioxide and water in the gaseous mixture fed to the gasification zone may vary in different systems from a mixture containing predominantly steam to one containing predominantly carbon dioxide. However, for a given system, once a particular ratio is selected, it should be maintained substantially constant in order to keep the system in proper heat balance.

The temperature of the gasification zone is maintained by the transfer of heat from the fuel cell. It is, therefore, somewhat below that normally employed in such gasification reactions. Accordingly, the steam conversion per pass through the gasification zone may be as low as 5 to 10 per cent, far below the 70 per cent conversion which is necessary for obtaining high efficiency of conversion of carbon to electrical energy. However, by continuously recycling the steam and carbon dioxide from the fuel cell, the adverse effects of low steam conversion per pass are susbtantially obviated. In this manner, it is possible to achieve unusually high efficiencies of carbon conversion to electrical energy without reference to the particular steam conversion per pass. By so utilizing steam and carbon dioxide as the gasification reactants in a recycle system, it becomes unnecessary to employ reactive carbons or gasification catalysts in the gasification zone.

For a better understanding of the present invention and its objects, reference should be had to the following detailed description of a preferred embodiment of the invention and modifications thereof; and to the accompanying drawings in which.

Figure 1:
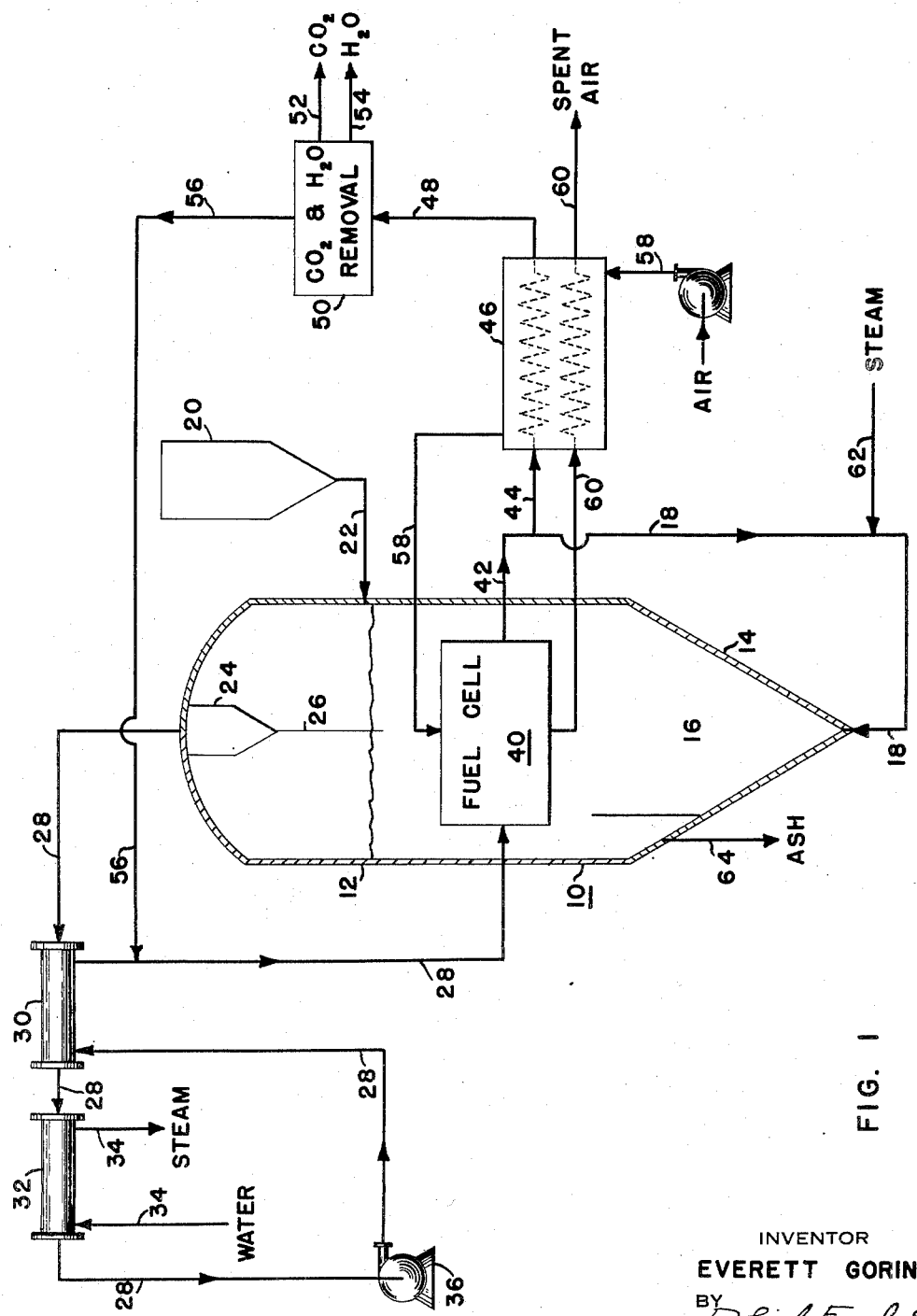
Figure 1 is an illustration, partly diagrammatic and partly in section, of an apparatus in which the preferred embodiment may be practiced.

Referring specifically to Figure 1 of the drawing, numeral 10 designates a gas generating vessel having a substantially cylindrical top section 12 and an inverted cone-shaped bottom section 14. This vessel is adapted to confine a fluidized bed of solids 16 at steam-carbon reaction temperatures and pressures. Associated with the bottom portion of the vessel is an inlet feed conduit 18 through which gaseous reactants are introduced into vessel 10. A hopper 20 for storing solids is provided for supplying carbon to the vessel 10 through a transfer conduit 22.

A cyclone separator 24 is suitably supported within the vessel 10 above the level of the bed 16. This separator is provided for removing any solid fines that may be entrained in the product gas and for returning them to the bed 16 through a dipleg 26. Leading from the cyclone separator is a conduit 28 for conducting the product gas to a fuel cell assembly 40. A pair of heat exchangers 30 and 32 are provided in conduit 28, the former being adapted to provide heat exchange between two sections of conduit 28, and the latter being adapted to provide heat exchange between a water line 34 and conduit 28. A pump 36 is also inserted in conduit 28 for circulating the gases therein.

The fuel cell assembly 40 comprises a plurality of individual fuel cells 41. The detailed construction of these fuel cells will be described later. They are completely immersed in the bed 16 and are adapted to convert the gaseous product from the gasification vessel to carbon dioxide and water (i. e. steam).

A conduit 42 is connected to the outlet of the fuel cell assembly and serves to carry away the carbon dioxide and steam produced in the cells. This conduit 42 communicates with the inlet conduit 18 and an off-take conduit 44. The latter is connected to a heat exchanger 46 for conducting hot gases thereto. A conduit 48 connects the heat exchanger 46 and a $CO_2$ and $H_2O$ removal unit 50. Conduits 52 and 54 are provided for carrying $CO_2$ and $H_2O$ respectively from the unit. A conduit 56 connects the removal unit 50 to conduit 28 for returning $CO_2$ and $H_2O$ free gases thereto.

An air conduit 58 is suitably connected to the fuel cell assembly 40 for supplying air thereto and passes through the heat exchanger 46. A conduit 60 is also suitably connected to the assembly 40 for carrying the spent air therefrom and also passes through heat exchanger 46. A steam conduit 62 is provided for introducing steam into inlet conduit 18. An ash discharge conduit 64 is connected to vessel 10 for removing ash from bed 16.

Figure 2:
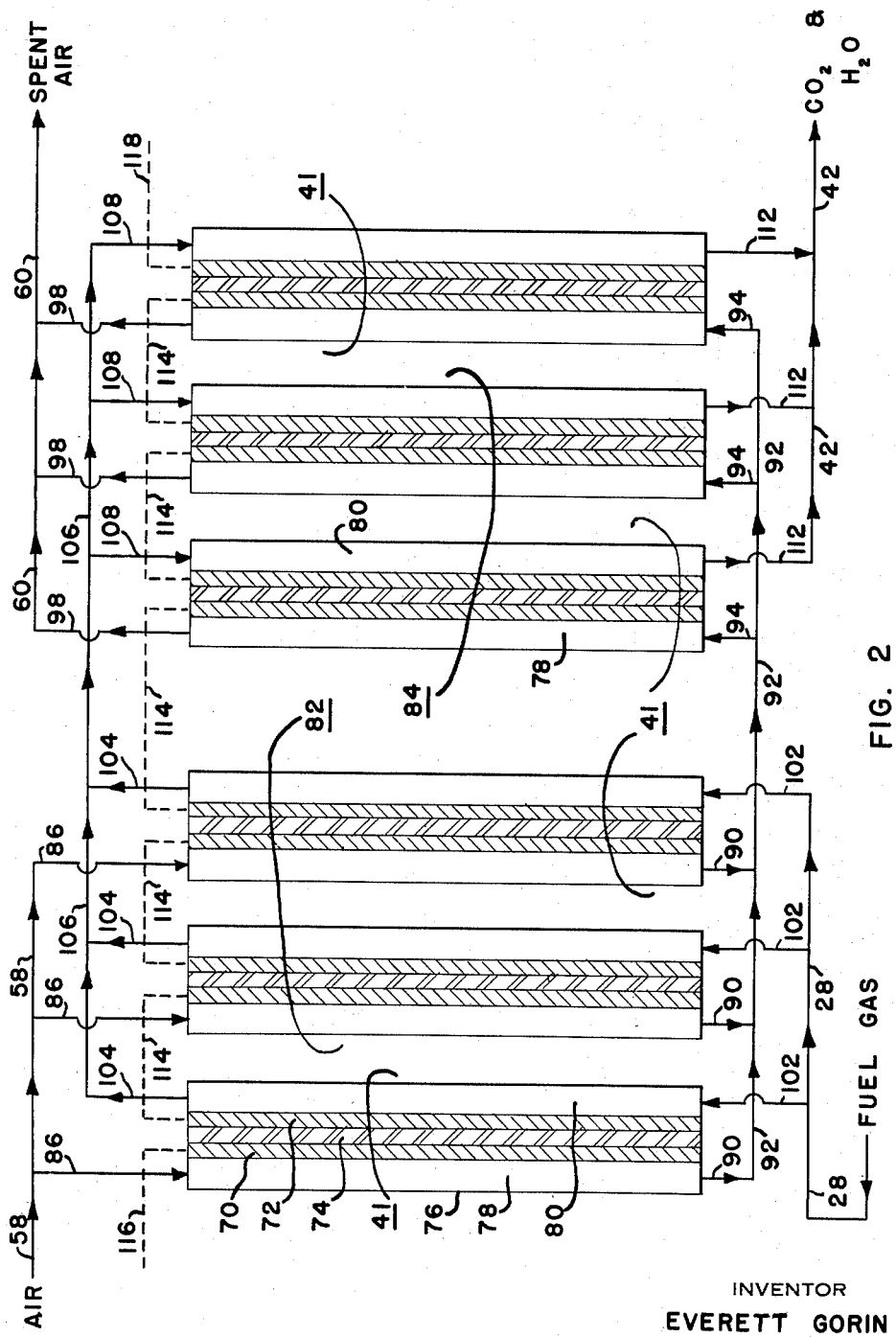
Figure 2 is an enlarged detailed view in cross section of the bank of fuel cells shown in Figure 1.

Referring specifically to Figure 2 of the drawing for a detailed description of the fuel cell assembly 40. The fuel cells 41 are identical in construction and are adapted to operate at temperatures as high as 1850° F. Each of them comprises two rectangular plate electrodes 70 and 72, arranged vertically in parallel spaced relationship to each other. Electrode 70 constitutes the anode of the cell and consists of iron-magnetite. Electrode 72 constitutes the cathode of the cell and consists of iron-iron oxide. The two electrodes are separated by a solid electrolyte 74 consisting of a high melting glass prepared from a mixture of sodium silicate, monazite sand, tungsten trioxide and sodium carbonate. A suitable composition, for example, consists of 43 per cent sodium carbonate, 27 per cent monazite sand, 20 per cent of tungsten trioxide and 10 per cent sodium silicate. The electrolyte may be shaped in the form of tubes or stamped in the form of a flat rectangular or circular plate. In either case, the electrodes are pressed against both sides of the electrolyte and an oxidizing gas is passed over the anode and a reducing gas over the cathode. It is to be understood that the composition of the fuel cell per se forms no part of the present invention, it being sufficient for my purposes that the cell be adapted to operate at elevated temperatures. Such cells are fully described in the literature. Gas Cell with Solid Electrolyte—Bull. Acad. Sci. USSR Classe Sci. Tech. 215–218 (1946); Zeit. fur Electrochemie 27, 199–208; Zeit. fur Electrochemie 44, 727–32, (1937). The cells described below are constructed with the electrolyte shaped in the form of a rectangular plate.

Each of the fuel cells 41 is provided with a box-like metal housing 76 having side walls spaced from the electrodes 70 and 72 to provide gas passages 78 and 80 respectively. Passage 78 is adapted to carry an oxidizing gas e. g. air in intimate contact with electrode 70, while passage 80 is adapted to carry a reducing gas, i. e. CO and $H_2$ called for convenience fuel gas, in intimate contact with electrodes 72. Each of the individual cells shown will in actual practice consist of a compact stacked assembly of anywhere from two to ten cells.

The plurality of fuel cells 41 are divided into two sections 82 and 84 with an equal number of cells in each section. The cells in a given section are arranged in parallel while the two sections are arranged in series with respect to gas flow therethrough. The arrangement of banks of cells in series is adapted to minimize the loss in cell voltage due to the decrease in partial pressure of the reactants as they are consumed in the cell reaction. Air is circulated to the upper ends of passages 78 in the cells of section 82 through conduits 86 from the main air conduit 58. Conduits 90 connect the lower ends of passages 78 with an interconnecting conduit 92. The latter in turn is connected to the lower end of passages 78 of the cells in section 84 by means of conduits 94. The upper ends of passages 78 of the cells in section 84 are connected to flue gas conduit 60 by means of conduits 98.

The fuel gas conduit 28 is connected to the lower ends of the passages 80 of the cells in section 82 by conduits 102. The upper ends of passages 80 communicate by means of conduits 104 with a conduit 106 which is adapted to convey gas from the passages 80 in section 82 to the upper ends of passages 80 in section 84 through conduits 108. The lower ends of passages 80 of the cells in section 84 communicate with conduit 42 through conduits 112.

The cells 41 are connected in series by electrical conductors 114 extending between electrodes. Electrical conductors 116 and 118 constitute the terminal leads of the cell system and may be connected to any electrical storage or power-driven unit.

The operation of the above system will now be described as applied to the conversion of the carbonaceous residue known as char which is produced by the low temperature carbonization of coal. It is to be understood, however, that any carbonaceous material capable of forming carbon monoxide and hydrogen upon reaction with steam may serve as the raw material, e. g. coal, coke, natural gas. When solid carbonaceous materials are employed as the feed to the system, either a fluidized or a fixed bed gasification process may be utilized. The fixed bed process is preferred when the fuel is of the lump variety. The char employed in the present instance is finely divided and, accordingly, readily suitable for use in a fluidized process.

Finely divided char is fed into vessel 10 from the hopper 20 through the transfer conduit 22. A gas comprising principally carbon dioxide and steam is continuously fed through inlet conduit 18 into vessel 10. The source of these gases will be more fully described below. The velocity of the gas circulating through the vessel 10 is regulated to maintain the solids in the vessel in a fluidized condition in conventional fashion. The level of the resulting fluidized bed of char is maintained above the fuel cell system 40 so that the latter is completely immersed in direct heat transfer relationship with the char. Heat is supplied to the gasification zone from the fuel cells as will be described later. The resulting temperature in the char bed lies below that of the cells which is preferably between 1300° and 1650° F. Accordingly, in general, the temperature of the gasification zone will be in the neighborhood of 1250–1600° F. At this temperature, the steam conversion per pass will be of the order of 10 to 45 per cent in the absence of catalysts depending on the temperature.

The products of the steam-carbon and the carbon dioxide-carbon reactions comprise an ash or a low carbon solid which may be withdrawn through conduit 64 as necessary to maintain the desired bed level, and a gaseous mixture containing carbon monoxide and hydrogen. The gaseous product is conducted to the cyclone separator 24 and is there freed of any entrained solid fines which are then returned to the fluidized bed 16 through dipleg 26. The solid-free gaseous product is there conducted through conduit 28 and through the pair of heat exchangers 30 and 32 to conduits 102 leading to the lower ends of passages 80 of the fuel cells in section 82.

The purpose of the heat exchangers 30 and 32 is to cool the hot product gas sufficiently to permit its being pumped by the pump 36. Heat exchanger 30 is arranged to transfer heat from the hot gaseous product from the gasification vessel to the same stream of gases after it has passed through heat exchanger 32 and through the pump 36. In this manner, the temperature of the gaseous product is raised before it reaches the fuel assembly but, of course, not to its original high point. In heat exchanger 32, water is circulated through conduit 34 in heat exchange relation with the gaseous product thereby cooling it and is converted to steam.

Concurrently with the introduction of fuel gas into the cell assembly, air is fed through conduit 58 to conduit 86 which leads to the upper ends of passages 78 of the fuel cells in section 82. The air is preheated before admission to the cells in heat exchanger 46.

At the anodes 70 of the cells in section 82 electrons are picked up by the iron oxide to release oxide ion or its equivalent into the solid electrolyte. The oxygen contained in the air circulating through passages 78 reacts with iron to maintain its state of oxidation, the remaining nitrogen and unreacted oxygen being discharged through conduits 90 and 92. At the cathodes 72 oxide ion is discharged to release electrons and oxidize the electrode to a higher oxide of iron. The carbon monoxide and hydrogen circulating through passages 80 reduce the higher iron oxide thus formed and are converted to carbon dioxide and water (i. e. steam) which are discharged along with unreacted carbon monoxide and hydrogen through the conduits 104 and 106. A portion of the energy thus released by the oxidation of the fuel gas generates electricity through the medium of the electrolyte 74.

The same cell reactions occur in the second section 84 between the electrodes and the unreacted gases from the first section 82, but with the gases circulating in an opposite direction from that of section 82.

The gaseous oxidation products comprising principally $CO_2$ and $H_2O$ produced in the cell system are discharged therefrom into conduit 42. The major proportion of the gas stream in conduit 42 is recycled to vessel 10 through conduit 18. A minor proportion is carried by conduit 44 to heat exchanger 46 where its sensible heat is in part transferred to the incoming air to the fuel cells.

That portion of the gaseous product bled off from conduit 42 through conduit 44 and through the heat exchanger 46 is conducted through conduit 48 to the system 50 for removal of the carbon dioxide and water. The carbon dioxide and water so removed are discharged from the system through conduits 52 and 54 respectively. The unburned carbon monoxide and hydrogen are recycled to the fuel cell through conduit 56 and conduit 28.

Owing to the fact that there is a net production of carbon dioxide in the system because of the conversion of carbon thereto, it is necessary to discharge this net production from the system in the manner indicated above. Concurrently therewith, there is also discharged a certain amount of water. Since there is very little net production of water, it is necessary to continually add water to the system. This is done through conduit 62 which is connected to conduit 18. If desired, steam produced in heat exchanger 32 may be employed.

The relative proportions of carbon dioxide and water in the gas feed to the gasification vessel may vary quite widely ranging from minor proportion of carbon dioxide to a major proportion thereof. However, once a particular proportion has been selected, it should be held substantially constant in order to maintain the over-all system in proper balance.

The electricity generated by the fuel cells is conducted from the cell system through the electrical leads 116 and 118. The individual cells generate a voltage in the range of 0.5–0.9 depending on the current density of the cell. The remainder of the energy is released as heat and transferred to the fluidized bed 16 in which the cells are immersed. As stated previously, the cells are designed to operate at about 1300° to 1650° F. and to maintain the temperature of the bed 16 from 50° to 100° F. below that of the cells. Because of the use of the fluidized bed, the heat developed by the cells is transferred rapidly and uniformly to all parts of the bed.

It is to be understood that the number of fuel cells shown is only for the purpose of illustration. The precise number employed will depend on the design of the particular system and on the capacity desired.

As a specific example of the operation of the above system to convert char to electrical energy, the following conditions and results are cited. The temperature of the fuel cells is 1520° F. and that of the fluidized bed of char is 1470° F. The molar ratio of steam to carbon dioxide fed to the gasification vessel is 0.75. Since one mol of $CO_2$ is produced for each mol of C gasified, it is necessary to reject this $CO_2$ from the system. To replace the $H_2O$ concurrently discharged, it is necessary to add 0.62 mol of $H_2O$ to the system.

In the following table are given the electrical efficiencies of the system under the conditions stated above. The total efficiency of conversion of carbon to electrical energy is the sum of two terms. The first term is the electrical energy constituting the direct output of the cell expressed as a percentage of the heat of combustion of the carbon consumed in the system. The second term is the electrical energy that may be produced from steam generated from the waste heat of the system; and is similarly expressed as the percentage of the heat of combustion of the carbon consumed in the system. In calculating the latter, it is assumed that the efficiency of conversion of waste heat via steam to electrical energy is twenty per cent. Since the electrical efficiency of the cell itself varies with the current density, the table shows the electrical efficiencies corresponding to different values of the current density in the cell.

Table

| Current density of the cell | 20 | 30 | 40 | 50 |
|---|---|---|---|---|
| Electrical efficiency: | | | | |
| Direct from cell | 75.5 | 72.5 | 69.6 | 66.6 |
| From waste heat | 4.9 | 5.5 | 6.1 | 6.7 |
| Total | 80.4 | 78.0 | 75.7 | 73.3 |

Figure 3:
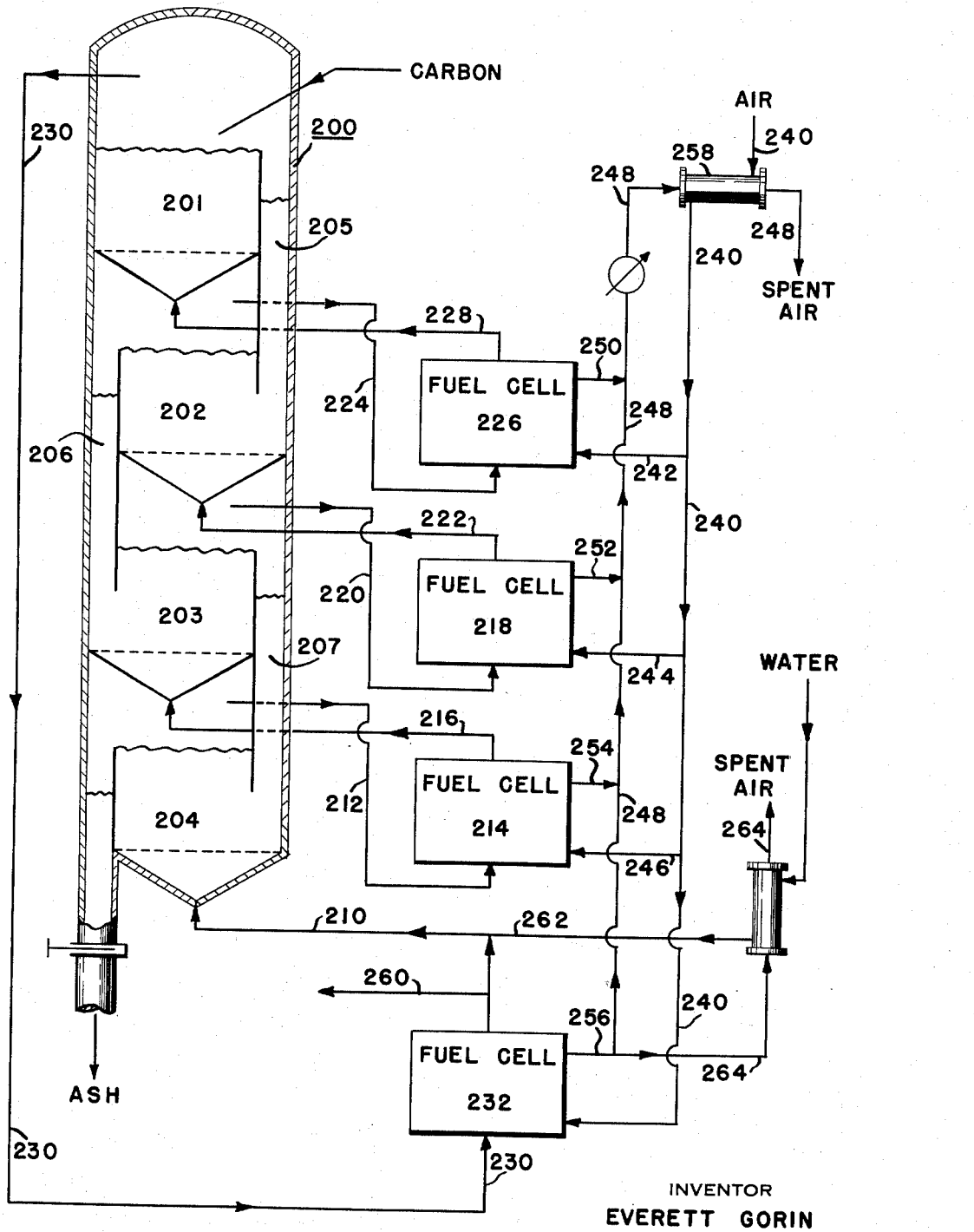
Figure 3 is a view, partly diagrammatic and partly in section, of a modification of the apparatus shown in Figure 1.

Referring to Figure 3 of the drawings, there is shown a modification of the preferred embodiment of my invention. The essential distinction of this modification lies in the use of a plurality of gasification zones and a corresponding number of fuel cell assemblies arranged to permit the gases to flow alternately through a gasification zone and a fuel cell assembly. The provision of a multistage gasification system makes it possible to reduce the amount of steam that has to be recycled in order to achieve efficiencies corresponding to steam conversions approaching 70%.

The apparatus shown in Figure 3 and its operation will now be briefly described. A gasification vessel 200 is provided for housing a plurality of fluidized gasification zones 201, 202, 203, and 204. Finely divided char is fed to the top zone 201 and thence passes by overflow conduits 205, 206, and 207 downwardly and sequentially through the other gasification zones. A gas comprising carbon dioxide and steam is introduced into the gasification zone 204 through inlet feed conduit 210 at a fluidizing velocity. The resulting gaseous product comprising carbon monoxide and hydrogen issuing from the gasification zone is conducted by conduit 212 to a fuel cell assembly 214. The latter is similar in construction and function to the previously described fuel cell assembly 40. The oxidation products and unreacted fuel gas from assembly 214 are carried through a conduit 216 into gasification zone 203.

In similar fashion, the gaseous products from gasification zone 203 are conducted to fuel cell assembly 218 through a conduit 220. The products from fuel cell assembly 218 are circulated through conduit 222 to gasification zone 202 where the carbon is gasified and the gaseous products are conducted through conduit 224 to fuel cell assembly 226. The gaseous products from the latter are passed through conduit 228 to gasification zone 201. The effluent gases from zone 201 are then carried through conduit 230 to fuel cell assembly 232. By this time a substantial conversion of the original steam has taken place. However, any unreacted steam along with the carbon dioxide and steam produced in the last fuel cell assembly 232 are recycled through conduit 210 to the gasification zone 204. The carbon content of the series of gasification zones decreases progressively from zone 201 to zone 204.

The temperature of this gasification zone, as well as that of each of the other gasification zones, is maintained at steam-carbon reaction temperatures by the sensible heat of the hot gases from the immediately preceding fuel cell. The temperature of each fuel cell assembly is maintained at a temperature above that of the gasification zone immediately following in the alternate arrangement of fuel cells and gasification zones.

The air required in the several fuel cell assemblies is introduced through conduit 240 with appropriate take-off conduits 242, 244, and 246. The spent air from the fuel cell assemblies is discharged from the system into a main discharge conduit 248 through appropriate transfer conduits 250, 252, 254, and 256. The incoming air may be preheated by heat exchange relationship with the hot flue gases or spent air by means of a heat exchanger 258.

As in the systems previously described, it is necessary to discharge the net production of carbon dioxide from the system. This may be done immediately following the fuel cell assembly 242 by means of a conduit 260. Again it is necessary to replace the water concurrently discharged with the carbon dioxide to maintain the proper ratio of carbon dioxide to steam. This water may be introduced into the inlet feed conduit 210 through a conduit 262. To convert the water to steam it may be passed in heat exchange relation with a side stream of hot spent air bled off from the main spent air conduit 248 through a conduit 264. In such a system as that just described, the total steam conversion will be determined by the number of stages in the gasification vessel and the gas recycle ratio. The number of stages may be increased to the point where substantially all of the steam conversion desired is obtained in a single traverse through the system by the steam. However, in accordance with this invention, the carbon dioxide and steam produced in a given fuel cell assembly is always conducted to a gasification zone so that a closed circulatory system of alternate gasification and electrochemical zones is provided. In this manner, total efficiencies of conversion of carbon to electrical energy in the neighborhood of 80% may be realized.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a system comprising at least one carbon gasification zone and at least one oxidation-reduction electrochemical zone, the method which comprises reacting steam and carbon dioxide with carbon in each gasification zone under conditions conducive to the formation of a gaseous product containing carbon monoxide and hydrogen, passing said gaseous product and an oxidizing gas separately into an electrochemical zone wherein carbon monoxide and hydrogen are oxidized to carbon dioxide and steam respectively and wherein a part of their heat of combustion is evolved in the form of electrical energy, conducting steam and carbon dioxide produced in each electrochemical zone to a carbon gasification zone, maintaining the temperature of each electrochemical zone above that of the carbon gasification zone to which gaseous products from the electrochemical zone are conducted, and recovering the electrical energy produced.

2. The method of converting carbon to electrical energy which comprises reacting a gaseous mixture containing steam and carbon dioxide with carbon in a gasification zone under conditions conducive to the formation of a gaseous product containing carbon monoxide and hydrogen, passing said gaseous product and an oxidizing gas separately into an electrochemical reaction zone wherein carbon monoxide and hydrogen in said gaseous product are oxidized to carbon dioxide and steam respectively and wherein a part of their heat of combustion is evolved in the form of electrical energy, maintaining the temperature of said electrochemical zone by the heat of combustion of said gaseous product above that of said gasification zone, recycling carbon dioxide and steam from said electrochemical zone to said gasification zone, maintaining the desired temperature in the gasification zone by means of heat transferred from said electrochemical zone, maintaining the ratio of steam to carbon dioxide fed to the gasification zone substantially constant, and recovering the electrical energy produced.

3. The method according to claim 2 in which the carbon is in the form of carbonaceous solids and the oxidizing gas is air.

4. The method according to claim 2 in which the electrochemical zone is maintained at a temperature between 1300° F. and 1650° F.

5. The method according to claim 2 in which the electrochemical zone is arranged in direct heat exchange relation with said gasification zone.

6. The method according to claim 2 in which a portion of the product gas from the cathode of the electrochemical zone is freed of carbon dioxide and steam and returned to said electrochemical zone.

7. The method of converting carbon to electrical energy which comprises reacting a gaseous mixture containing steam and carbon dioxide with carbon in a gasification zone under conditions conducive to the formation of a gaseous product containing carbon monoxide and hydrogen, passing said gaseous product and air separately into an electrochemical reaction zone wherein carbon monoxide and hydrogen in said gaseous product are oxidized to carbon dioxide and steam respectively and wherein a part of their heat of combustion is evolved in the form of electrical energy, maintaining the temperature of said electrochemical zone by the heat of combustion of said gaseous product above that of said gasification zone, conducting the electrochemical reaction in direct heat exchange relation with said gasification zone, whereby at least a major proportion of the heat required in the gasification zone is transferred directly from the electrochemical zone, recycling the major proportion of the gaseous oxidation product from the electrochemical zone back to the gasification zone without intentional cooling, passing the remaining portion of said gaseous oxidation product from the electrochemical zone in heat exchange relation with the air fed to said zone, removing $CO_2$ and $H_2O$ from said remaining portion, thereafter returning the $CO_2$ and $H_2O$ free gas to the electrochemical zone, maintaining the ratio of steam to carbon dioxide fed to the gasification zone substantially constant, and recovering the electrical energy produced.

8. The method of converting carbon to electrical energy which comprises passing steam and carbon dioxide through a plurality of carbon gasification zones under conditions conducive to the formation of a gaseous product containing carbon monoxide and hydrogen, passing the gaseous product from each gasification zone and an oxidizing gas separately into one of a plurality of electrochemical reaction zones wherein carbon monoxide and hydrogen in said gaseous product are oxidized to carbon dioxide and steam respectively and wherein a part of their heat of combustion is evolved in the form of electrical energy, said gasification zones and said electrochemical zones being alternately and serially arranged to permit recirculatory flow of a single stream of gas through the entire system, maintaining the temperature of each electrochemical zone by the heat of combustion of said gaseous product above that of the gasification zone immediately following said electrochemical zone, conducting carbon dioxide and steam from each electrochemical zone to that gasification zone which immediately follows in the above defined alternate arrangement, maintaining the desired temperature in each gasification zone by means of heat transferred from the immediately preceding electrochemical zone in said series arrangement, and recovering the electrical energy produced.

EVERETT GORIN.

No references cited.